(12) United States Patent
Sukhomlinov et al.

(10) Patent No.: US 9,998,483 B2
(45) Date of Patent: Jun. 12, 2018

(54) SERVICE ASSURANCE AND SECURITY OF COMPUTING SYSTEMS USING FINGERPRINTING

(71) Applicant: McAfee, Inc., Santa Clara, CA (US)

(72) Inventors: Vadim Sukhomlinov, Santa Clara, CA (US); Kshitij A. Doshi, Chandler, AZ (US); Alex Nayshtut, Gan Yavne (IL); Igor Muttik, Aylesbury (GB)

(73) Assignee: McAfee, LLC, Santa Clara, CA (US)

( * ) Notice: Subject to any disclaimer, the term of this patent is extended or adjusted under 35 U.S.C. 154(b) by 71 days.

(21) Appl. No.: 14/978,539

(22) Filed: Dec. 22, 2015

(65) Prior Publication Data
US 2017/0180399 A1   Jun. 22, 2017

(51) Int. Cl.
*H04L 29/06* (2006.01)
*G06F 9/455* (2018.01)

(52) U.S. Cl.
CPC ...... *H04L 63/1416* (2013.01); *G06F 9/45558* (2013.01); *H04L 63/1425* (2013.01); *G06F 2009/45591* (2013.01)

(58) Field of Classification Search
CPC ............. H04L 63/1416; H04L 63/1425; G06F 9/45558
See application file for complete search history.

(56) References Cited

U.S. PATENT DOCUMENTS

| | | | | |
|---|---|---|---|---|
| 2009/0248611 A1* | 10/2009 | Xu | | G06F 9/45533 |
| 2009/0320021 A1* | 12/2009 | Pan | | G06F 11/0715 718/100 |
| 2010/0023810 A1 | 1/2010 | Stolfo et al. | | |
| 2010/0107180 A1* | 4/2010 | Ulrich | | G06F 9/4443 719/318 |
| 2013/0080375 A1 | 3/2013 | Viswanathan et al. | | |
| 2013/0097659 A1* | 4/2013 | Das | | G06F 21/629 726/1 |
| 2014/0068068 A1 | 3/2014 | Bansal et al. | | |
| 2014/0157405 A1 | 6/2014 | Joll et al. | | |
| 2014/0181971 A1 | 6/2014 | Tatarinov et al. | | |
| 2016/0371489 A1* | 12/2016 | Puri | | G06F 17/30563 |

OTHER PUBLICATIONS

PCT International Search Report and Written Opinion received in corresponding application No. PCT/US2016/060305 dated Feb. 6, 2017, 18 pages.

* cited by examiner

*Primary Examiner* — Carl G Colin
*Assistant Examiner* — Vance M Little
(74) *Attorney, Agent, or Firm* — Hanley, Flight & Zimmerman, LLC

(57) ABSTRACT

Providing detection of computing application malfunctions by performing at least the following: collecting a plurality of computing events that correspond to a computing application and a plurality of addresses associated with the plurality of computing events, generating an event trace that comprises the plurality of computing events and the plurality of addresses, constructing at least one sample fingerprint that represents a current behavior of the computing application using at least the event trace, comparing the at least one sample fingerprint with a behavior model that represents an expected operation of the computing application; and determining whether the computing application is malfunctioning based upon the comparison of the at least one sample fingerprint and the behavioral model.

20 Claims, 9 Drawing Sheets

SERVICE ASSURANCE AND SECURITY OF COMPUTING SYSTEMS USING FINGERPRINTING

TECHNICAL FIELD

Embodiments described herein generally relate to processing computer instructions by modelling and comparing computing behavior for one or more computing systems, and in particular for producing timely alerts of computing application malfunctions using fingerprints.

BACKGROUND ART

Computer virtualization deployments provide improvements for modern communication and data networks in terms of computational efficiency, cost, and speed. For instance, a variety of data centers may provide cloud-based networking services to a variety of different end users or tenants. Specifically, virtualized network environments are advantageous in implementing multi-tenancy by consolidating and sharing computational resources amongst different tenants. Multi-tenancy generally refers to a plurality of computing tenants, such as virtual machines (VMs) that share a physical host, server, and/or other types of physical computing nodes that comprise computing resources. Virtualized network environments are also able to provide a variety of new applications and/or services to the end users. For example, deployments where single computing applications are packaged into special purpose virtual computing nodes (e.g., containers and VMs) are gaining widespread acceptance with the maturing of Docker® and other similar virtualization technologies.

As virtualized network environments continue to become common place, computing security threats, such as computer malware, viruses, worms, and Trojans, are becoming a growing concern plaguing today's network systems. Computing security threats are typically designed to perform a variety of intrusive functions that include, but are not limited to disrupting computer operations, gathering personal and confidential information, and/or gaining access to private computing and network systems. To perform these intrusive functions, the computing security threats are generally encoded to exploit vulnerabilities and/or security lapses within the software (e.g., operating systems and web browsers) of a computing system. For example, malware based on return-oriented programming (ROP), may utilize a buffer overrun vulnerability to execute the malware instructions. Unfortunately, as today's network-based technologies (e.g., the Internet and the cloud) continue to gain in popularity, the proliferation of malware and other computing security threats continue to flourish.

To protect today's information systems, computing systems are often equipped with a variety of security computing applications, such as anti-malware that attempt to provide countermeasures from computing security threats. For example, anti-malware applications are able to reduce vulnerability and harm from malware attacks by providing real-time preventive protection and/or removal of potential malware code. Additionally, other computing applications may implement a trusted computing environment that measures computing code, computing processes, and/or VMs before execution to ensure their genuineness. However, as malware and other computing security threats become more sophisticated, existing computing safeguards may be unable to protect against the wide variety of threats that include, but are not limited to bugs, Trojan horses, time bombs, stack smashing, and ROP. For instance, security breaches of protected electronic information continue to persist for computing systems used in information sensitive sectors, such as the financial industry, government entities, and large corporations. As such, constantly improving the technology of detecting and processing of incoming computing security threats remains valuable in providing computing defenses against evolving and unknown computing security threats.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
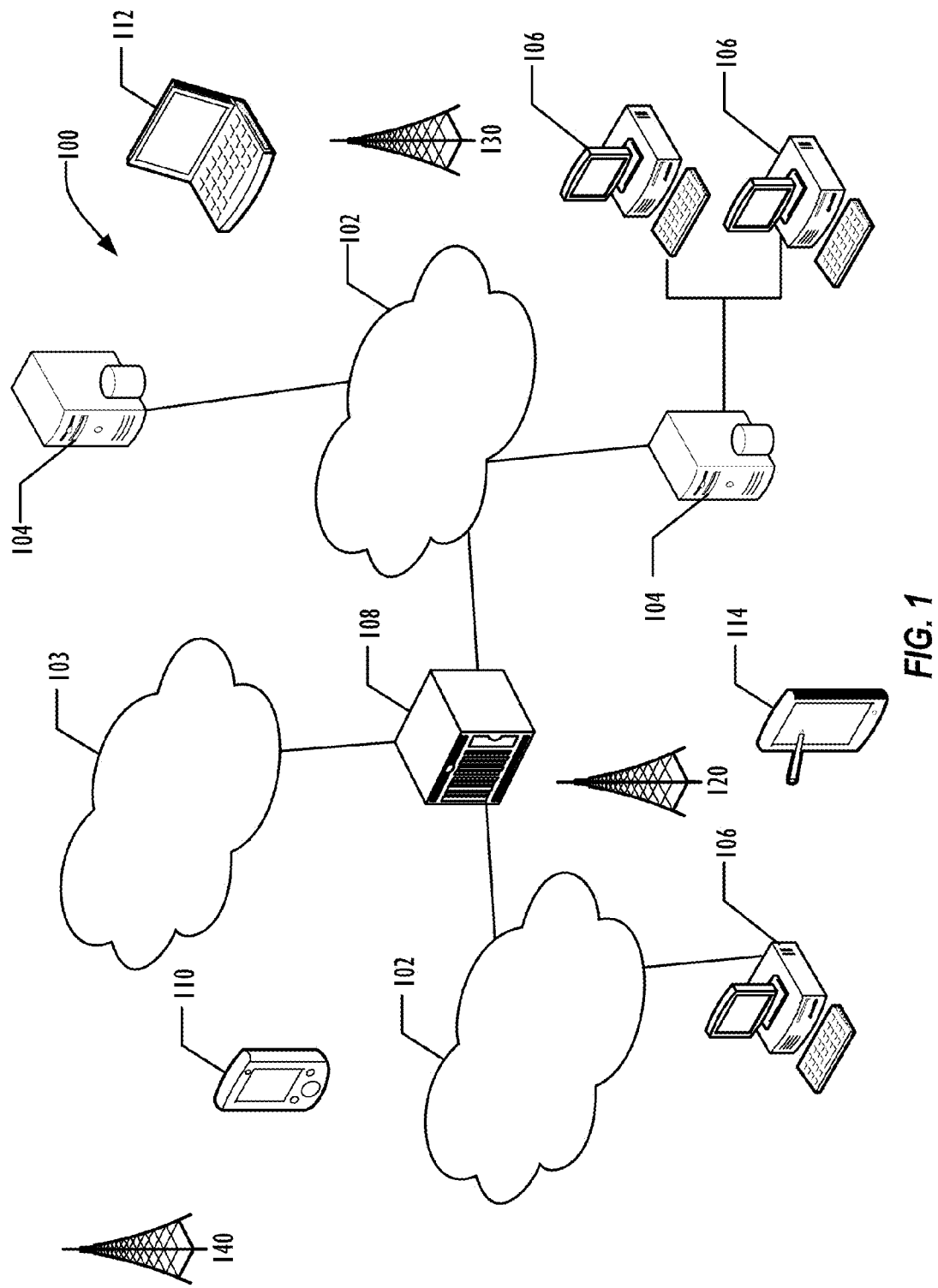
FIG. 1 is a schematic diagram of an embodiment of a network infrastructure where embodiments of the present disclosure may operate herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computing system" can refer to a single electronic computing device that includes, but is not limited to a single computer, host, virtual machine (VM), container, tenant, server, network device, wearable electronic device, and/or mobile device (e.g., smartphone, tablet, and/or other smart device) or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "fingerprint" refers to a categorized summary measure of one or more executed computing instructions for a computing system. A fingerprint includes any type of representation (e.g., a data sequence) that characterizes a computing behavior.

As used herein, the term "computing application malfunctions" refers to any deviation from normal and/or expected computing operations for a computing application.

As used herein, the term "computing application" refers to a computing module, program, process, workload, thread and/or a set of computing instructions executed by a computing system. Example embodiments of a computing application include software modules, software objects, firmware (e.g., Basic Input/Output System (BIOS)), and/or other types of executable code.

As used herein, the term "computing event" refers to any event or occurrence triggered from one or more computing policies associated with hardware, firmware, and/or software. Examples embodiments of computing events include hardware-level events (e.g., branch misprediction), operating system-level events (e.g., interrupts), and/or device-level events. The term "computing events" may also interchanged and be generally referred throughout this disclosure as "performance events."

Disclosed herein are various embodiments that detect computing application malfunctions, such as bugs, infinite loops, resource abuse, crashes, exceptions, exploits, and/or other deviations from normal and/or expected computing operations. To detect application malfunctions, a computing system may obtain one or more sampled fingerprints and compare the sampled fingerprints with one or more reference fingerprints. A fingerprinting engine may construct one or more sampled fingerprints based on collecting computing events, their associated memory addresses, and context information of each computing system (e.g., VM). The reference fingerprints may represent and/or be part of a behavior model created online and/or offline and can be updated dynamically. The fingerprinting engine may then compare the deviation of the sampled fingerprints with the reference fingerprints with a deviation threshold. The comparison results may flag suspicious behaviors within a computing application and/or flag abnormal changes within hardware and/or software occurrence that avoids exhaustive analysis that may consume a relatively significant amount of time, tax a computing system, and/or distort observations it depends upon. Exhaustive analysis, such as model training and updating may be moved either to offline or to backend computations.

FIG. 1 is a schematic diagram of an embodiment of a network infrastructure 100 where embodiments of the present disclosure may operate herein. Network infrastructure 100 comprises a plurality of computer networks 102. Each of the computer networks 102 may contain a number of other devices typically referred to as Internet of Things (microcontrollers, embedded systems, industrial control computing modules, etc.). Specifically, computer networks 102 comprise one or more different types of computer networks available today, such as the Internet, enterprise networks, data centers, a wide area networks (WAN), and/or a local area networks (LAN). Each of these networks within computer networks 102 may contain wired and/or wireless programmable devices that operator in the electrical and/or optical domain, and also employ any number of network communication protocols (e.g., TCP/IP). For example, one or more of the networks within computer networks 102 may be a wireless fidelity (Wi-Fi®) network, a Bluetooth® network, a Zigbee® network, and/or any other suitable radio based network as would be appreciated by one of ordinary skill in the art upon viewing this disclosure.

The networks within computer networks 102 may also comprise switches, routers, and/or other network hardware devices configured to transport data over computer networks 102. Moreover, one or more of the networks within computer networks 102 may be configured to implement computer virtualization, such as virtual private network (VPN) and/or cloud based networking. FIG. 1 illustrates that computer networks 102 may be connected to computers 106, computer servers 104, and one or more network nodes 108, which include, but are not limited to gateways, routers, and/or wireless access points. The computers 106 and/or computer servers 104 may each comprise a plurality of VMs, containers, and/or other types of virtualized computing systems for processing computing instructions and transmitting and/or receiving data over computer networks 102. The computers 106 and computer server 104 may be configured to support a multi-tenant architecture, where each tenant may implement its own secure and isolated virtual network environment. Although not illustrated in FIG. 1, the network infrastructure 100 may connect computer networks 102 to a variety of other types of computing device, such as VMs, containers, hosts, storage devices, wearable electronic devices, and/or any other electronic device capable of transmitting and/or receiving data over computer networks 102. The functionality of the network node 108 may be implemented in any device or combination of devices illustrated in FIG. 1; however, most commonly is implemented in a firewall or intrusion protection system in a gateway or router.

As shown in FIG. 1, network infrastructure 100 may also comprise a cellular network 103 for use with mobile communication devices. The cellular network 103 may be capable of supporting of a variety of electronic devices that include, but are not limited to computers, laptops, and/or a variety of mobile devices (e.g., mobile phones). Using FIG. 1 as an example, electronic devices in the network infrastructure 100 may communicate via the cellular network 103 are illustrated as mobile phones 110, laptops 112, and tablets 114. A mobile device, such as mobile phone 110, may interact with one or more mobile provider networks as the mobile device moves, typically interacting with a plurality of mobile network towers 120, 130, and 140 for connecting to the cellular network 103. Although referred to as a cellular network 103 in FIG. 1, a mobile device may interact with towers of more than one provider network, as well as with multiple non-cellular devices such as network node 108. In addition, the mobile devices 110, 112, and 114 may interact with non-mobile devices such as computers 104 and computer servers 106 for desired services.

In one or more embodiments, one or more mobile devices 110, 112, and 114, computer servers 104, computers 106, and/or other computing systems may detect threats to security and/or service assurance. Embodiments of the electronic computing devices may provide security detection and protection by utilizing a trusted computing environment, such as trusted execution technology (TXT) and software guard extensions (SGX), and/or implement heuristic detections algorithms that detect previously unknown threats based on signatures of malware behavior. However, these security detection and protection mechanism may be unable to prevent one or more exploits such as ROP, bugs, Trojan horses, time bombs, detecting risks to performance QoS arising from noisy neighbors or poor scheduling of resources when sharing a computing infrastructure. For example, trusted computing environments (e.g., TXT) that perform various measurements on computing code and/or other types of data loaded into computing memory before execution may be unable to protect against malware that change application behaviors (e.g., ROP, bugs, Trojan horses, and time bombs). Moreover, heuristic detections algorithms often access specific system objects, sequence of application program interface (API) calls, and/or parameters of system call, and thus, may fail to detect risks to performance QoS arising from noisy neighbors or poor scheduling of resources.

In one embodiment, one or more mobile devices 110, 112, and 114, computer servers 104, computers 106, and/or other computing systems may be configured to timely detect computing application malfunctions caused from unknown security threats and/or service performance risks that alter the normal and/or expected execution of computing applications. To timely detect computing application malfunctions, the computing systems may match sampled fingerprints corresponding to an executing computing application to one or more fingerprint references (e.g., a set or a list of fingerprint references) that form or are part of a behavior model. The computing system may comprise a fingerprint engine that monitors processor level information (e.g., performance counters) and/or other computing events located at higher computer hierarchy levels that correspond to one or more executing computing applications. The behavior model may be a behavioral or dynamic attestation that may complement static or data at rest attestation measurements.

In one embodiment, computing event traces may be implemented to track the identified computing events over a specified time. The computing event traces may be subsequently grouped individually or in microbatches to integrate the computing events into fingerprints. The computing system may compare a sampled fingerprint for a target workload with fingerprint references associated with a behavior model to determine a deviation from normal and/or expected operations. If the deviation is relatively small, execution of the computing application continues. Conversely, if the deviation is equal to and/or exceeds a certain deviation threshold, the electronic computing device may perform an in-depth analysis to determine whether the deviation originates from a computing security threat and/or a performance risk. To determine whether a computing security threat and/or a service performance risk exists, the computing system may perform further code analysis that includes, but is not limited to binary translation, emulation, various heuristics, signature matching or combinations thereof.

Figure 2:
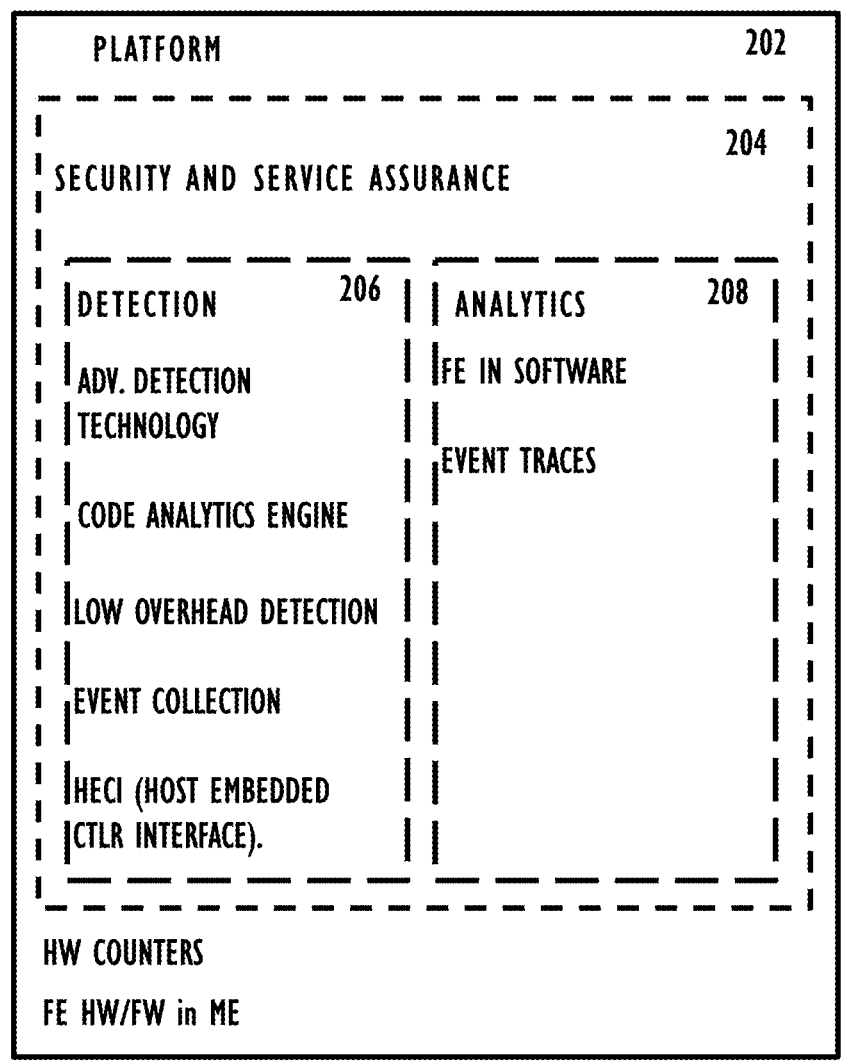
FIG. 2 is a schematic diagram of an embodiment of a computing system architecture configured to timely detect application malfunctions.

FIG. 2 is a schematic diagram of an embodiment of a computing system architecture 200 configured to timely detect application malfunctions. Using FIG. 1 as an example, the computing system architecture 200 may be implemented in one or more mobile devices 110, 112, and 114, computer servers 104, computers 106, and/or other computing systems capable of connecting to computer network 102 and/or cellular network 103. As shown in FIG. 2, the computing system architecture 200 illustrates the component relationships between the platform 202 and security and service assurance component 204. The platform 202 may provide a plurality of computing resources implemented in hardware, firmware, software, or combinations thereof for one or more virtualized computing nodes. For example, platform 202 may comprise the hardware, firmware, and/or software used to support multiple computing systems, such as tenants, VMs, and/or containers. Platform 202 may also be configured to support a variety of network virtualization technologies, such as virtual local area network (VLAN), virtual extensible local area network (VX-LAN), network virtualization using generic routing encapsulation (NVGRE), and network virtualization overlays (NVO3). The platform 202 may comprise a plurality of core processors (e.g., central processing unit (CPU) cores), where each core processor includes performance counters that monitor relevant computing events and/or registers that record branching computing events. As shown in FIG. 2, platform 202 may include computing hardware for implementing a fingerprint engine that generates fingerprints based on sampled performance events. In one embodiment, the hardware for the fingerprint engine may be implemented using a management engine within a core processors, such as the Manageability Engine (ME) found in certain chipsets provided by Intel®.

The security and service assurance component 204 may be implemented using a subset of the hardware, firmware, and/or software resources of platform 202 and configured to detect computing application malfunctions. In one embodiment, the security and service assurance component 204 may configure some of the computing resources in platform 202 to perform specialized and/or a particular computing functions used to timely detect application malfunctions that pose as potential security and/or service assurance threats. FIG. 2 illustrates that the security and service assurance component 204 may comprise a detection component 206. The detection component 206 may implement relatively low overhead detection by collecting computing events and their associated memory address space associated with one or more executing computing applications. The detection component 206 may initially detect whether an application malfunction occurs by determining the deviation between the sampled fingerprints and the fingerprint references. To provide a more in-depth data analysis, the detection component 206 may comprise a code analytics engine that detects potential security threats and/or service assurance risks or whether the behavior model fails to include a non-harmful, expected, and/or normal sequence of computing instructions. For example, the constructions of the behavior model may not have accounted for a sequence of computing instructions associated with a computing application that is executed in limited circumstances. The detection component 206 may also perform memory mapping that connects hardware-level addresses to logical application level objects, such as mapping of a host physical memory address to a guest virtual memory address and vice versa.

In one embodiment, the security and service assurance component 204 may comprise an analytics component 208 that receives the collected computing events from the detection component 206. The analytics component 208 may use the collected computing events and memory locations of the computing events to generate event traces for a fingerprinting engine. The fingerprinting engine within the analytics component 208 may be implemented using software. For example, the fingerprinting engine within the analytics component 208 may be located within a virtual machine manager (VMM) or hypervisor. In addition to receiving information for computing events, the fingerprinting engine may also maintain a running context for each monitored computing system (e.g., each VM). A context may include a limited history of a specific computing system. The analytics component 208 may also determine whether to invoke the code analytics engine within the detection component 206 for further analysis of the computing application associated with the collected computing events. The detection component 206 and an analytics component 208 are discussed in more detail in FIG. 3.

The security and service assurance component 204 may be configured to implement a just-in-time analysis that optimizes a behavior model as new states or conditions appear or are discovered. Creating an exhaustive model behavior profile of a computing system that is optimized, secure, and high availability may have practicality issues by utilizing a significant amount of platform's 202 computational resource. Instead of creating an exhaustive model behavior profile, the security and service assurance component 204 may perform backend or offline analytics to refresh or refine existing behavior models. In one embodiment, the backend or offline analytics may be implemented at a backend server and/or at some other remote device. The security and service assurance component 204 may fine tune both the time when model refinements are undertaken and the additional information collected for accomplishing such refinements.

Implementation of the security and service assurance component 204 provides a variety of uses that include security and performance isolation and/or maintaining a desired quality of service (QoS) even when platform 202 is shared among numerous computing systems. The security and service assurance component 204 may use the detection component 206 and/or the analytics module 208 to prevent a rogue set of computing instructions (e.g., malware) from taking over operating environments of a computing system, such as a VM. In one embodiment, when the comparison between the sampled fingerprint and reference fingerprints is equal to and/or exceeds a certain deviation threshold, an intervention may be triggered, which may be handled by logging (e.g., recording the computing event) and/or by a more reactive method that performs other computing operations besides recording the computing event. An example of a reactive method is to revector execution into a monitored mode for more intrusive information gathering. A hypervisor or a VMM may, for example, may force an interpretive or binary-translated execution to check whether a computing system (e.g., VM) is invoking a rare but safe code paths that explains a rise in branch mispredictions. In a TXT system, the hypervisor or VMM may choose to re-measure executables to verify that the privileged code has not been altered.

The security and service assurance component 204 may also use the detection component 206 and/or the analytics module 208 to check whether the components and resources of a computing system (e.g., VM) are operating as expected and correctly prioritized. Specifically, the security and service assurance component 204 may mitigate noisy neighbors or detect shifts in a computing system's resource needs. Noisy neighbors may be other computing applications, VMs, containers, co-tenants, and/or other types of computing systems that monopolize bandwidth, inputs/outputs (I/Os), processing power, and/or other shared computing resources. Fingerprinting may determine whether the right code paths are being exercised in the right proportion in the number of executed instructions. However, an above-normal shift may occur in various event densities, such as cache misses, and the dropping of the inter-process communication (IPC) may indicate a reduction in computing performance. A possible cause is a noisy neighbor, which can be detected by a change in distribution of cache misses, translation lookaside buffer (TLB) misses and/or other types of other types of computing events. In this instance, the hypervisor or VMM may employ a temporary allocation in CPU assignments and subsequently test whether the computing event data and the IPC move in the right direction. If the observed behaviors change but performance does not, it may suggest that performance loss is intrinsic to a computing system's operation and not caused by insufficient isolation.

Another benefit of the security and service assurance component 204 may be the use of dealing with certain malware code and/or security threats, such as bugs and time bombs. Typically, to protection against rootkits, platform 200 may use static signatures, such as TXT in which a computing system is measured at certain points. However, security attacks or problem behaviors can be embedded until a computing system's environment creates certain condition combinations or one or more chain of events, such as trapdoors, are activated at an arbitrary later time which may be difficult to detect. In a multi-tenant environment, there is a greater impact from such threats because the security threat and/or malware code may compromise the computing resources of platform 200 that are shared amongst multiple virtualized computing nodes (e.g., VMs). The security and service assurance component 204 detects these type of security threats by noticing that the dynamic behavior of the computing system or virtualized computing nodes deviate in certain critical respects from a set of normal or expected computing behaviors.

Figure 3:
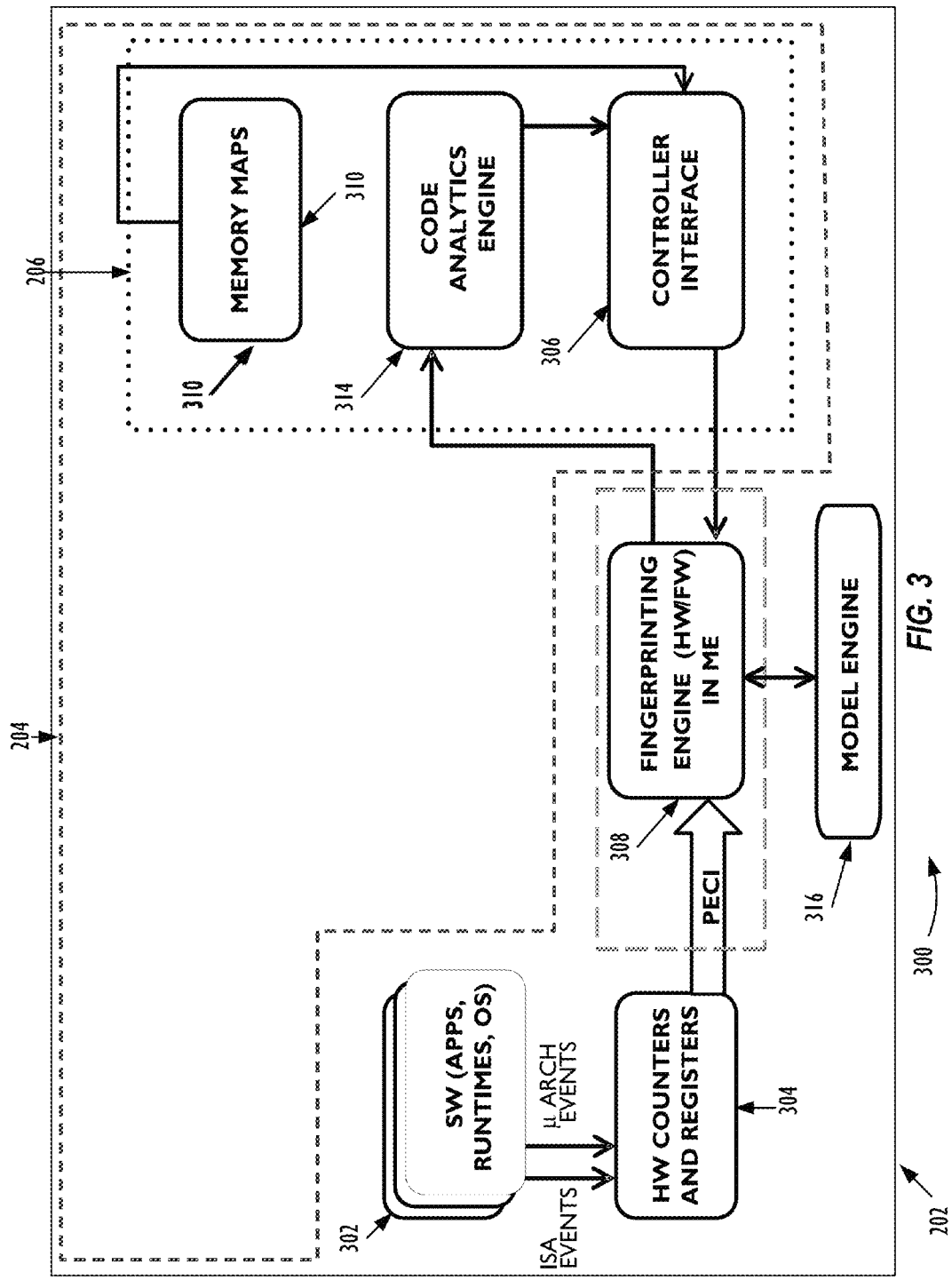
FIG. 3 is a schematic diagram of an embodiment of a computing system configured to implement a dynamic feedback that timely detects application malfunctions using a hardware-based fingerprinting engine.

FIG. 3 is a schematic diagram of an embodiment of a computing system 300 configured to implement a dynamic feedback that timely detects application malfunctions using a hardware-based fingerprinting engine 308. The computing system 300 may be based on the computing system architecture 200 illustrated in FIG. 2 and may comprise the platform 202 and the security and service assurance component 204. FIG. 3 illustrates that a plurality of computing applications 302, such as operating systems, applications, and/or runtimes, are executed by computing system 300 or a virtualized computing node (e.g., VM and container) that is part of the computing system 300. The computing applications 302 may generate computing events, such as micro-architectural events (e.g., cache misses, port saturations, branch mispredictions) and instruction behavior events (e.g., the number of instructions by category, the number non-local control transfers, instruction set architecture (ISA) events)) that hardware counters and registers' 304 may monitor and track.

In addition to monitoring and tracking the type of computing events, the hardware counters and registers 304 may also track the associated address information of the computing events. The hardware counters and registers 304 may output the computing event type information and the associated address information to the hardware-based fingerprinting engine 308. In one embodiment, the hardware counters and registers 304 may be Performance Management Unit (PMU) counters used in Intel® processors. The information from the hardware PMU counters and registers 304 may be communicated over a platform controller interface, such as the Platform Environment Control Interface (PECI).

In one embodiment, the hardware-based fingerprinting engine 308 may be configured to receive [event, address] tuples via the platform controller interface, where the event element represents the type of computing event and the address element represents the memory address associated with the computing event. For example, the hardware-based fingerprinting engine 308 may receive the tuple [L1-miss, OxFA803911] that identifies a cache level 1 (L1) miss at memory location OxFA803911. In instances where the computing event relates to branch mispredictions, the tuple may include the pair of locations <from-address, to-address> associated with the branch. Other data structures besides tuples may be used to receive computing events and addresses, such as vectors, lists, and/or arrays.

The hardware-based fingerprinting engine 308 may also be configured to receive memory map information from a controller interface 306. The memory map information may map the raw physical addresses to the computing application addresses associated with the computing event. For example, the hardware-based fingerprinting engine 308 may receive the memory map of the VM(s) and the host and maps the host physical address to the guest virtual address for executing modules within the VM(s). As shown in FIG. 3, the controller interface 306 may receive the memory map information from a memory map component 310. The memory map component 310 may comprise the mapping of processes that have access to specific memory locations over time. The memory map information connects hardware level information (e.g., processor information and host physical address) to logical application level objects, so that analysis and comparison with reference fingerprints can proceed independent of loading variations. In embodiments where the hardware-based fingerprinting engine 308 is located within the ME of an Intel® processor, the controller interface 306 may be a host-embedded controller interface (HECI).

The hardware-based fingerprinting engine 308 may also be configured to receive fingerprint references and threshold deviation criteria or value. The fingerprint references may form and/or are associated with a behavior model for a workload associated with a computing application. Other workloads for a computing application may have its own corresponding fingerprinting references. In one embodiment, the fingerprint references may be coefficients of a neural network, or some other pattern recognition and/or representation modelling known by persons of ordinary skill in the art. The threshold deviation criteria or value may depend on the quality and/or precision of the behavior model and the achieved balance between performance and precision of detection of abnormal or unpredictable computing behaviors. The fingerprint references and threshold deviation criteria or value may be dynamically updated with the training and/or updating of the behavior model.

FIG. 3 illustrates that creating, training, and updating of the behavior model may be implemented using model engine 316. A variety of different types of models, such neural networks and support vector machine (SVM) models, static or dynamic, batch or real-time, and/or complete or incremental model may be used to create behavior models and obtain the fingerprint references. The behavior models implemented may depend on the type of security issue and/or service assurance detected by the hardware-based fingerprinting engine 308. Creating, training, and updating of the behavior model may be moved to a backend service, such as a backend server security information and event management (SIEM), while retaining incremental refinement with the computing system. Typically, creating, training, and updating the behavior model would be implemented on a remote system because of the computational intensity, but creating, training, and updating the behavior model may also be implemented on the local resources on platform 202, for example, using dedicated cores for quick building of initial behavioral model, simplification of setup and/or for other design reasons. As shown in FIG. 3, after creating, training, and updating the behavior model, model engine 316 may send the fingerprint references to the hardware-based fingerprinting engine 308. In one or more embodiments, the behavior model may be a behavioral or dynamic attestation that are used in addition to static or data at rest attestation measurements (e.g. TXT). Details of creating, training, and updating the behavior model is provided in method 600 of FIG. 6.

The hardware-based fingerprinting engine 308 may be configured to construct fingerprints based on the sampled computing events received from the hardware counters and registers 304. In one embodiment, the format for the fingerprints (e.g., sampled fingerprint and/or fingerprint references) may be an array of values, with each element of the array representing a metric in a specific category. The metric may comprise a vector value, though commonly, it may be a scalar coefficient for a specific behavior model. The metric interpretation depends on the model. A distance measure, such as Euclidean and Manhattan, allows assessment of deviation from normal(s) and some model/usage criterion determines conditions for triggering corrective actions. The hardware-based fingerprinting engine 308 may generate other embodiments of a fingerprint that use other schemas to characterize computing behavior.

The hardware-based fingerprinting engine 308 may also be configured to maintain a running context for each monitored computing system and its processes and modules. The running context, which comprises a limited history of the computing system, may be updated with the sampled computing event inputs. Maintaining a running context provides an iterative evolution of the employed matching algorithm. More than one fingerprints reference may exist for a given computing system that depend on the legitimate bottlenecks. The running context is described in more detail in method 600 of FIG. 6.

The hardware-based fingerprinting engine 308 may use the fingerprint references received from model engine 316 and the sampled fingerprints to generate a deviation score as an output. In one embodiment, the deviation score may be normalized that measures a distance between the fingerprint references and the computing system's current execution based on the sampled fingerprint. For example, fingerprint references may represent the frequency of different type of computing instruction executions for each range of code addresses. When normalizing the deviation score, the hardware-based fingerprinting engine 308 may use the fifty code ranges with the most computing instructions and measure the distance in a 50-dimensional space between the sampled fingerprints and the fingerprint references.

The hardware-based fingerprinting engine 308 may compare the threshold deviation criteria or value with the deviation score. The comparison results may trigger one or more code analytics engines 314 that perform further analysis on whether the deviation is caused from a security threat and/or service performance risk or from unknown normal computing behavior. For instance, the threshold deviation criteria or value may be equal and/or exceed the deviation score when the fingerprinting references do not include computing behavior not see during model creation. Alternative, the threshold deviation criteria or value may be equal and/or exceed the deviation score when a computing system, such a VM, accesses some critical system function that is symptomatic of a security attack. To determine whether a deviation is caused from a security threat and/or service performance risk, the code analytics engines 314 may use a variety of data analysis technique that include binary translation, emulation, various heuristics, signature matching, and/or other algorithms known by persons of ordinary skill in the art to detect security threat and/or service performance risk. The code analytics engine 314 may then communicate a summary of its analysis and determination of whether the deviation is caused from security threat and/or service performance risk or from unknown normal computing behavior to the hardware-based fingerprint engine 308 via the controller interface 306. If code analytics engine 314 communicates via its summary to the hardware-based fingerprinting engine 308 that the deviation represents normal behavior, the hardware-based fingerprinting engine 308 may send event trace data and the context information of the computing behavior to the model engine 316 for behavioral model updating.

Figure 4:
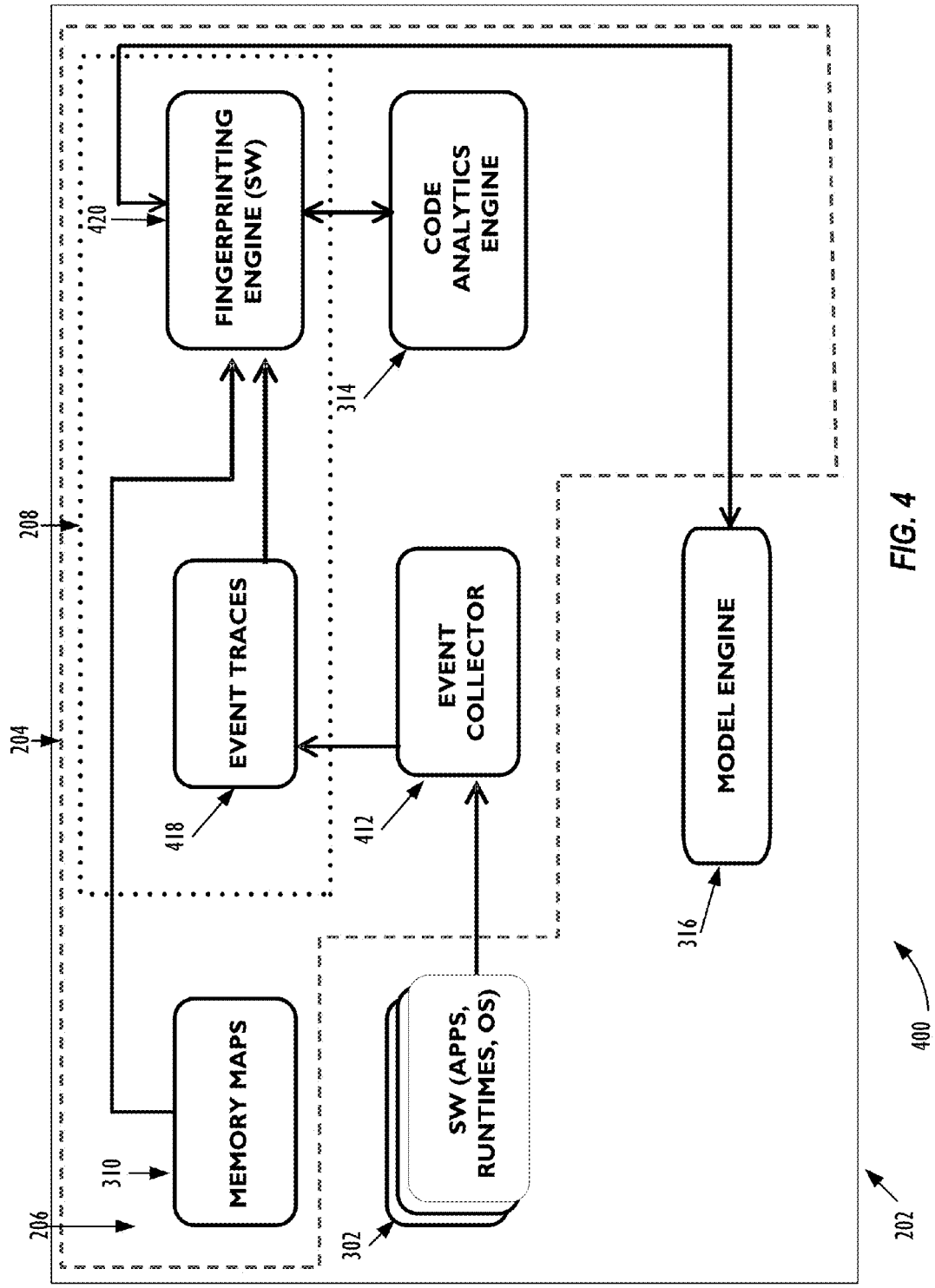
FIG. 4 is a schematic diagram of an embodiment of a computing system configured to implement a dynamic feedback that timely detects application malfunctions using a software-based fingerprinting engine.

FIG. 4 is a schematic diagram of an embodiment of a computing system 400 configured to implement a dynamic feedback that timely detects application malfunctions using a software-based fingerprinting engine 420. A software-based fingerprinting engine 420 may be implemented when the hardware resources of computing system 400, such as the core processors, are unable to perform hardware-based fingerprinting engine functions as described in FIG. 3. FIG. 4 illustrates that the computing system 400 may comprise the analytics component 208 that includes a computing event trace 418 and a software-based fingerprinting engine 420. In computing system 400, during execution of the computing applications 302, rather than using hardware counter and registers to collect computing events, the computing events are collected using an event collection component 412. The event collection component 412 may record the type of computing event and the associated address for the computing event.

The event collector 412 may then forward the computing event information to a computing event trace 418 that generates a computing event trace. The computing event trace may represent a summary value per interval that describes where a computing application within a computing system 400 spends its time. The computing event trace 418 may also preprocess the computing event traces such that the computing event information is grouped and sent (e.g., in a tuple format) to a software-based fingerprinting engine 420. The fingerprinting engine 420 performs substantially the same functions as the hardware-based fingerprinting engine 308 discussed in FIG. 3, except that the software-based fingerprinting engine 420 is implemented using a software application rather than hardware. As shown in FIG. 4, the software-based fingerprinting engine 420 may receive fingerprint references from the model engine 316. In one embodiment, the software-based fingerprinting engine 420 may implemented within a hypervisor or a VMM.

The memory map 310 may provide the memory map information to the software-based fingerprinting engine 420 to map physical raw addresses to the addresses associated with the computing applications executed on the computing system. The software-based fingerprinting engine 420 may use the mapping to identify the computing application. The comparison results from the fingerprinting engine 420 may be subsequently outputted to the code analytics engine 314 to determine whether the deviation of the sampled fingerprints and fingerprint references are the product of a security threat and/or service performance risk.

Figure 5:
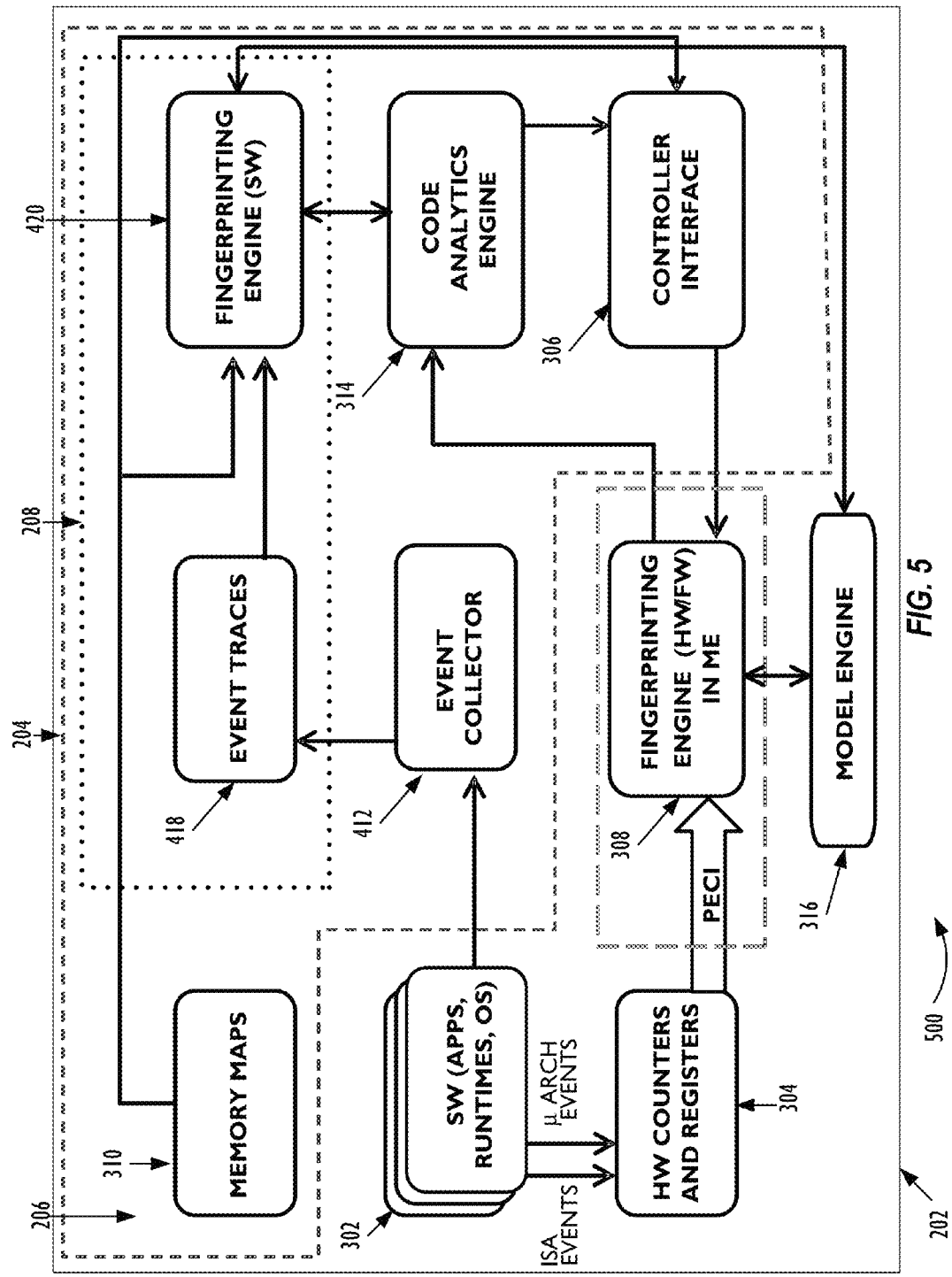
FIG. 5 is a schematic diagram of an embodiment of a computing system configured to implement a dynamic feedback that timely detects application malfunctions using both a hardware-based fingerprinting engine and a software-based fingerprinting engine.

FIG. 5 is a schematic diagram of an embodiment of a computing system 500 configured to implement a dynamic feedback that timely detects application malfunctions using both a hardware-based fingerprinting engine 308 and a software-based fingerprinting engine 420. The computing system 500 may implement both the hardware-based fingerprinting engine 308 and the software-based fingerprinting engine 420 to improve computing efficiency, flexibility, and/or security. For instance, the hardware-based fingerprinting engine 308 may be relatively less susceptible to security threats, such as malware attacks, and relatively more efficient in processing certain types of computing events than a software-based fingerprinting engine 420. A software-based fingerprinting engine 420 may be more flexible and configured to perform more sophisticated fingerprinting processes than a hardware-based fingerprinting engine 308. In some embodiments, the software-based fingerprinting engine 420 may be configured to drive the hardware fingerprinting engine 308.

Figure 6:
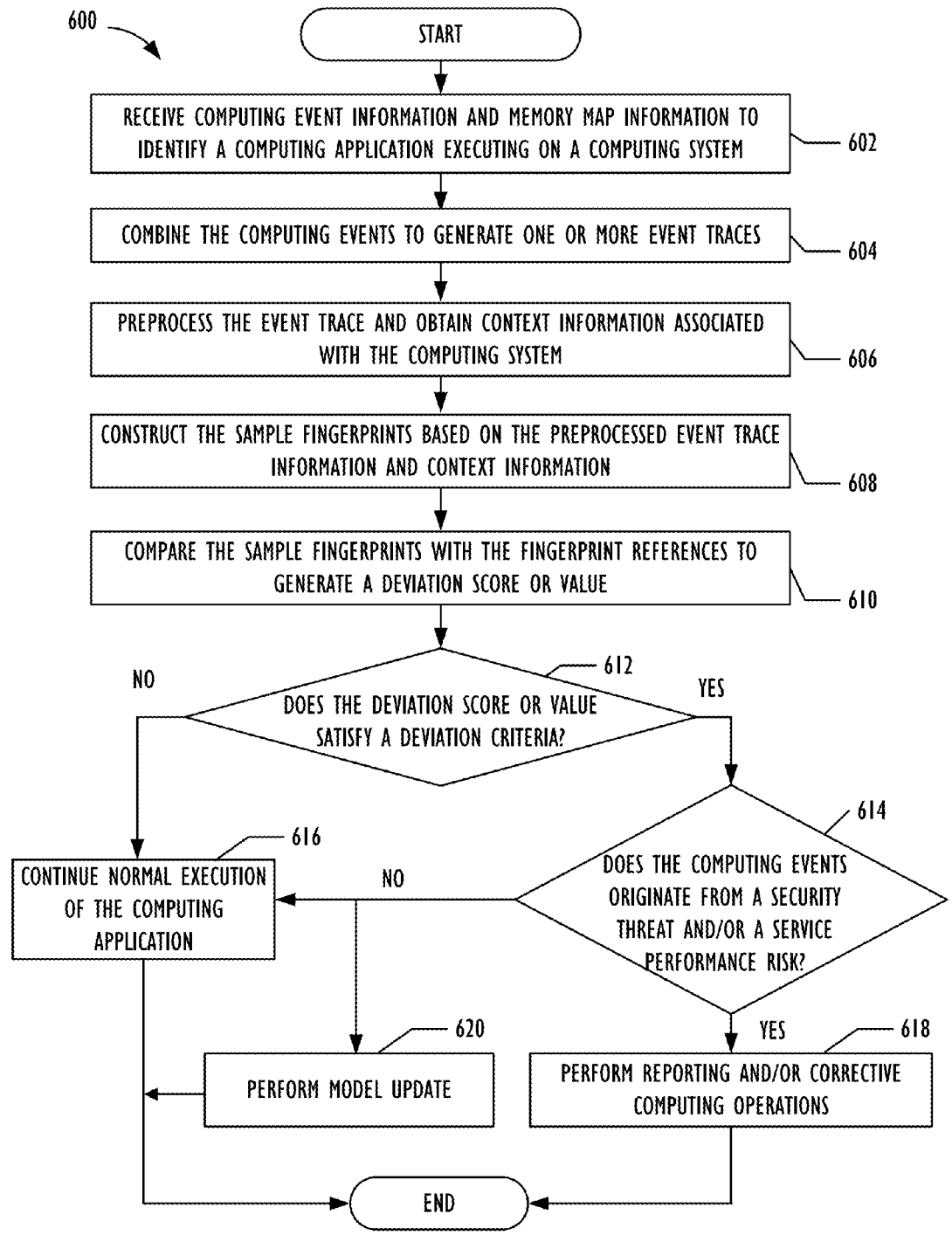
FIG. 6 is a flow chart of an embodiment of a method that detect application malfunctions.

FIG. 6 is a flow chart of an embodiment of a method 600 that detect application malfunctions. Using FIGS. 1 and 2 as an example, method 600 may be implemented using the computing system architecture 200 and/or within be one or more mobile devices 110, 112, and 114, computer servers 104, computers 106, and/or other computing systems capable of connecting to computer network 102 and/or cellular network 103. Method 600 may match behavior profile of one or more computing applications to matched sets of fingerprint references that represent or are part of one or more behavior models. The behavior models may predict and represent the normal and/or expected execution of computing applications for a computing system. Method 600 may also update and train the fingerprint references, behavior model, and/or the threshold deviation criteria or value to accommodate new patterns of behavior discovered for the computing applications. Method 600 may perform fingerprinting process using hardware, software, or both.

Method 600 may start at block 602 to receive computing event information and memory map information to identify a computing application executing on a computing system. The memory map information may be obtained locally and/or externally from a memory map database. The computing event information may include the computing event type and the address information associated with the computing event. Based on the computing event information and the memory map information, method 600 may be able to determine the computing application addresses currently be executed by the computing system.

Method 600 may then continue to block 604 and combine the computing events to generate one or more event traces, where the event traces provide a summary value per interval describing the computing application's time spent in corresponding memory locations. Method 600 may then proceed to block 606 and preprocess the event trace and obtain context information associated with the computing system. Method 600 may preprocess the event trace by grouping individually or in microbatches the event traces into a specific format, such as in tuples, vectors, lists, and/or arrays. In embodiments where the computing system may comprise virtualized computing nodes, such as VMs and containers, method 600 may maintain context information for each of the virtualized computing nodes. The context includes a limited history of the computing node and may provide iterative evolution of the matching algorithm used to compare the sample representation and reference representation.

At block 608, method 600 may construct the sample fingerprints based on the event trace information and context information generated from block 606. The sample fingerprints may represent or be part of a behavior model for the current executed computing application. Method 600 may then move to block 610 and compare the sample fingerprints with the fingerprint references to generate a deviation score or value. The fingerprint references may represent or be part of a behavior model of the normal and/or expected behavior of the computing application. In one embodiment, the deviation score or value may be a normalized deviation score that measures a distance between the fingerprint references and the sample fingerprints.

Method 600 may then move to block 612 and determine whether the deviation score or value satisfies a deviation criteria. For example, if the deviation score or value is equal to and/or greater than a certain deviation threshold associated with the fingerprint references, then method 600 may determine that the deviation score or value satisfies the deviation criteria. If method 600 determines that the deviation score or value satisfies the deviation criteria, then method 600 may proceed to block 614; otherwise, method 600 continues to block 616 to continue normal execution of the computing application.

At block 614, method 600 may trigger further data analysis of the computing application to determine whether the computing events originate from a security threat and/or a service performance risk. Method may use one or more security threat detection and/or service performance algorithms known by persons of ordinary skill in the art. For instance, method 600 may employ signature-based detection, heuristic analysis, binary translation, emulation, and/or combination thereof to detect security threats and/or service performance risks. If method 600 determines that the computing application represents a security threat and/or service performance risk, method 600 may move to block 618 to perform a variety reporting and/or corrective computing operations in response to a security threat and/or service performance risk. In one embodiment, at block 616, method 600 may report the problem to the hypervisor or VMM to take appropriate corrective action. In another embodiment, method 600 may attempt to repair and/or terminate the code.

If method 600 determines that the computing application is not a security threat and/or service performance risk, then method 600 may proceed to blocks 612 to continue normal execution of the computing application. Method 600 may also proceed to block 620 to perform a model update, which could be implemented at the back-end, offline, and/or by another remote computing system. In other embodiments, method 600 may implement block 620 within a local computing system depending on the computing intensity. Method 600 may perform the model update by using the preprocessed event trace data and the context information to retrain the fingerprint references associated with a behavior model. The behavior model may be trained by saving the event traces and using algorithms for different matching methods, such as neural networks and algorithms used for matching sounds and music (e.g., Shazam application and/or similar application). Model training may also include predictions of the next state, such as the map observed state to the next predicted state. Method 600 may also refine how to adjust the deviation score and/or threshold at block 618. Specifically, updating and retraining implemented method 600 may be dependent on the different types of models. For example, if the model behavior is not covered by the existing model, method 600 may more neurons for an internal layer of a neural network and/or coefficients of an SVM may be updated using retraining. Method 600 may then end if no additional computing events are received. If additional computing events are received, method 600 may use the updated fingerprint references to compare the sample fingerprints as discussed in block 610.

Figure 7:
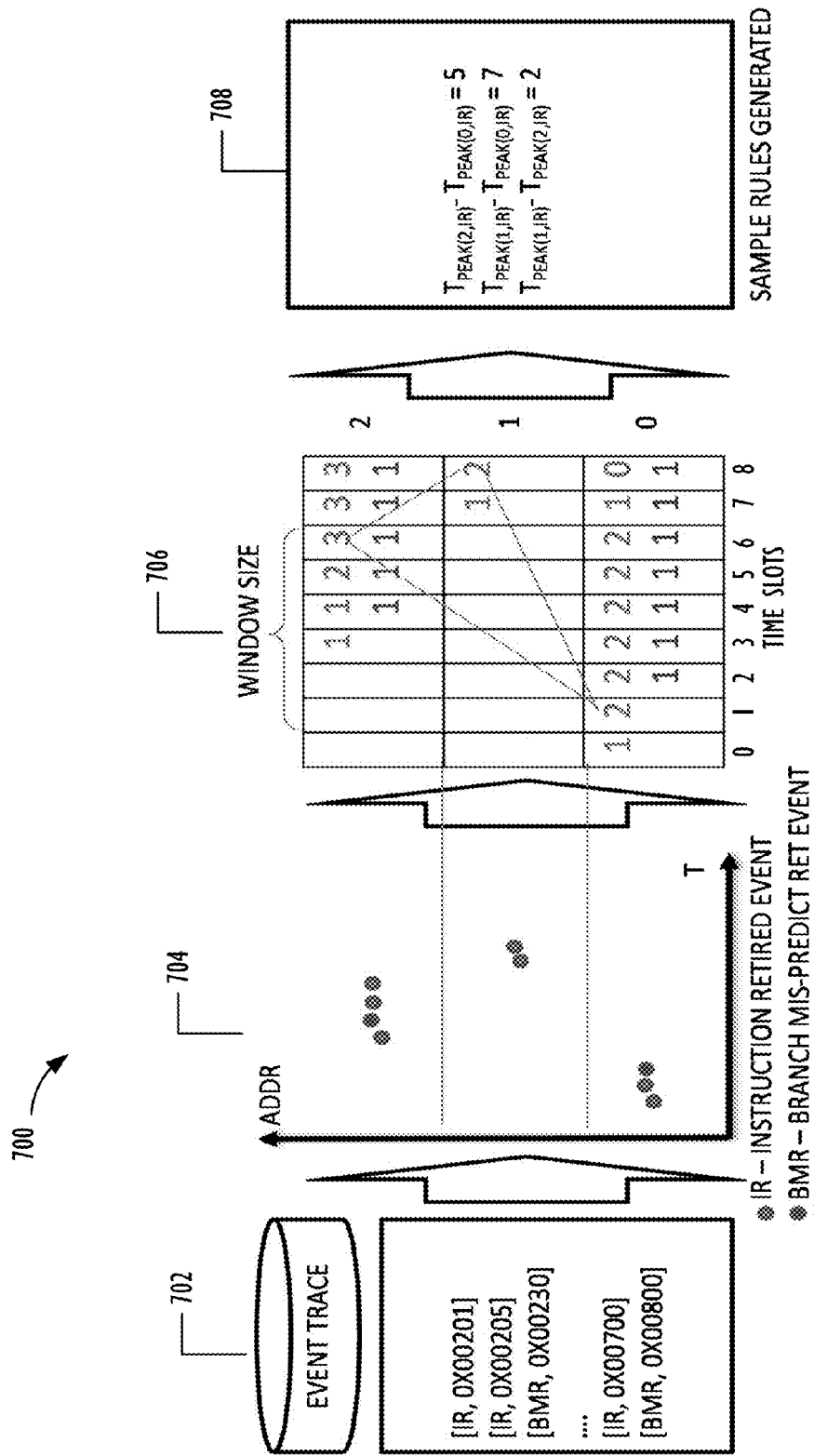
FIG. 7 is a process flow of an embodiment of a fingerprinting process for an example computing application using a fingerprinting engine.

FIG. 7 is a process flow of an embodiment of a fingerprinting process 700 for an example computing application using a fingerprinting engine. In FIG. 7, the fingerprinting process 700 collects two types of computing events, instruction retire (IR) and branch misprediction retire (BMR) and groups the computing events into an event trace 702 that includes the computing type and computing event addresses. The event trace 702 is then fed into the fingerprinting engine and groups the computing events according to different address ranges so that locality of code execution can be tracked over time as shown in chart 704. For example, if a memory address space is about three megabytes, then memory address space may be divided into three different ranges, where the address space for each range is about one megabyte. Chart 704 illustrates that the y-axis is categorical and not numerical grouping and the x-axis represents time.

Time may be divided into intervals and the fingerprinting process 700 may track the number of computing events and type of computing events within chart summary 706. The chart summary 706 may split the time space into N parts, numbered 0 . . . N−1 time slots. In FIG. 7, the time is measured by instructions executed rather than the number of clocks. For example, the instructions may be about a 64 bit value with about eight parts, each a rank of about four bits for about a four-bit encoded category. As shown in FIG. 7 the first and second IR computing event occurs in address range 0 at time slots 0 and 1 and the first BMR computing event occurs in address range 0 at time slot 2. Afterwards, in address range 2, the next three IR computing events occur at time slots 3, 5, and 6, and the second BMR computing occurs at time slot 4. The last two IR computing events are generated in address range 1 and occur at time slots 7 and 8. By grouping both the IR and BMR event traces into address categories yields an additional level of detail about a computing application's behavior within the address ranges to form the fingerprints.

In FIG. 7, the summary of the fingerprint rules 708 comprise fingerprint references that are determined from the timeslot differences between the peak numbers of IR computing event for two address ranges. Specifically, FIG. 7 illustrates that for address range 0, the peak number of IR instructions is 2, which first occurs at time slot 1; for address range 1, the peak number of IR instructions is 2, which first occurs at time slot 7; and for address range 2, the peak number of IR instructions is 3, which first occurs at time slot 6. The sample rules generated in the summary of the fingerprint rules 708 is based on the difference of the time slot values associated with when the first peak number of IR instructions occurs for two address ranges. For example $T_{peak(2,IR)}$ equals time slot 6 and $T_{peak(0,IR)}$ equals time slot 1, and thus $T_{peak(2,IR)}-T_{peak(0,IR)}=5$. Although FIG. 7 does not illustrate rules for BMR computing events, the summary of the fingerprint rules 708 may also include fingerprint rules for BMR computing events. The sample rules generated within the summary of the fingerprint rules 708 represents the update fingerprint references received from a model engine, such as model engine 316 shown in FIG. 3.

If the example computing application was a known good test case, then the fingerprint may be used to train and update a behavior model and become a fingerprint reference. If the example code is not a known test case, the event trace may be preprocessed to generate sample fingerprints that are compared with one or more fingerprint references (e.g., a list of reference fingerprints). The comparison of the sample fingerprints and fingerprint references are typically not computationally expensive, and it is useful in detecting, in near real-time, when workload behavior over a set of small number of samples deviates from a calculated norm or from a collection of normal and/or expected behavior for a computing application.

The fingerprinting process 700 performed within a fingerprint engine may be adapted to detect reference workloads, where each has its own fingerprint references, and sample fingerprints can be compared to those fingerprints frequently and in real time with negligible overhead. Since microarchitectural behaviors are fingerprinted simultaneously with ISA behavior, subtle departures from normal can be detected quickly and with light-weight detection. For example many branch mispredictions can be suggestive of a security threat and/or a service performance risk if the pure code footprint does not give sufficient indication, for example, a slow developing attack.

Figure 8:
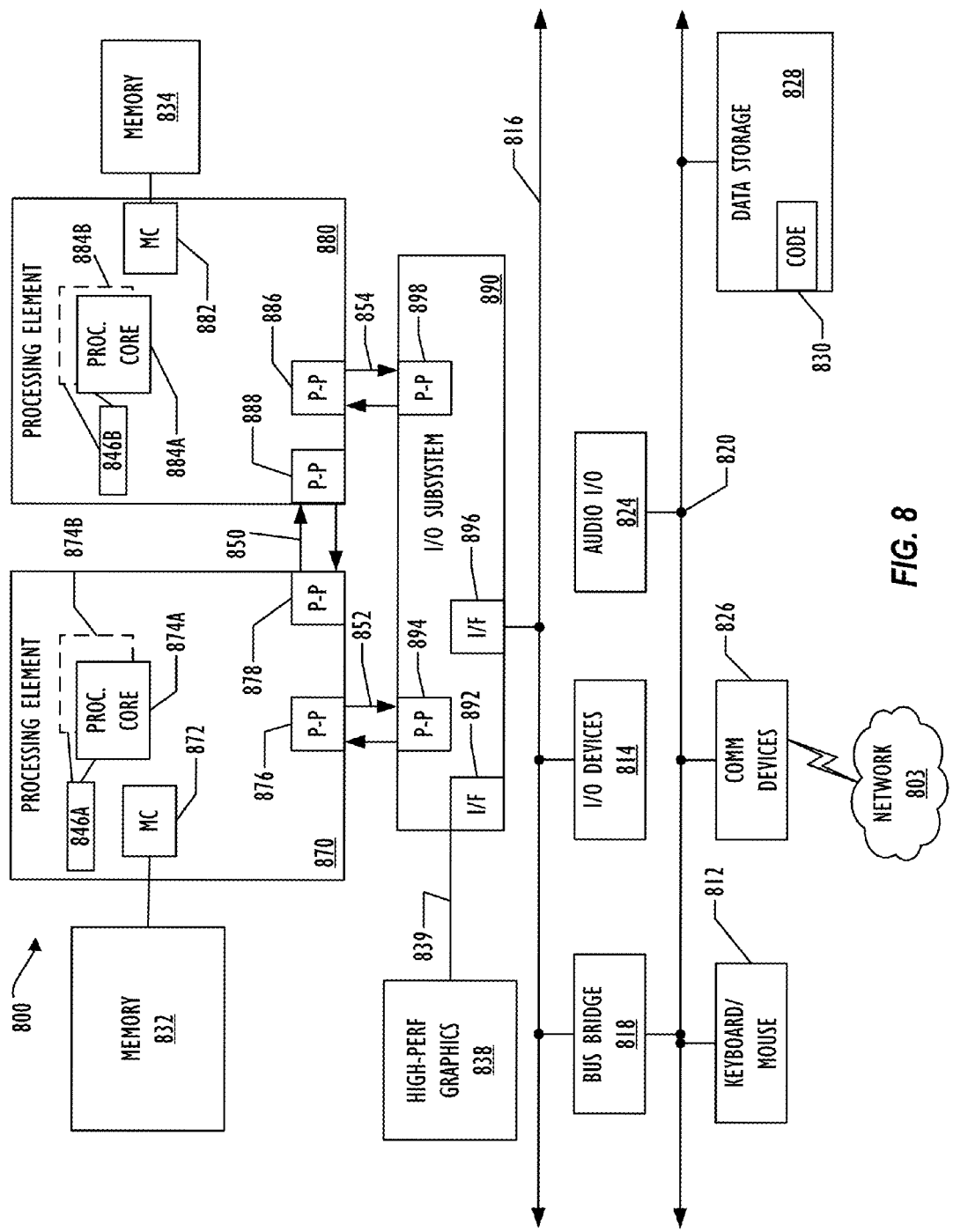
FIG. 8 is a block diagram illustrating an embodiment of a computing device for use with techniques described herein.

Referring now to FIG. 8, a block diagram illustrates a programmable device 800 that may be used for implementing the techniques described herein in accordance with one or more embodiments (e.g., computing system architecture 200, computing systems 300, 400, and 500, and method 600). The programmable device 800 illustrated in FIG. 8 is a multiprocessor programmable device that includes a first processing element 870 and a second processing element 880. While two processing elements 870 and 880 are shown, an embodiment of programmable device 800 may also include only one such processing element.

Programmable device 800 is illustrated as a point-to-point interconnect system, in which the first processing element 870 and second processing element 880 are coupled via a point-to-point interconnect 850. Any or all of the interconnects illustrated in FIG. 8 may be implemented as a multi-drop bus rather than point-to-point interconnects.

As illustrated in FIG. 8, each of processing elements 870 and 880 may be multicore processors, including first and second processor cores (i.e., processor cores 874a and 874b and processor cores 884a and 884b). Such cores 874a, 874b, 884a, 884b may be configured to execute computing instruction code. However, other embodiments may use processing elements that are single core processors as desired. In embodiments with multiple processing elements 870, 880, each processing element may be implemented with different numbers of cores as desired.

Each processing element 870, 880 may include at least one shared cache 846. The shared cache 846a, 846b may store data (e.g., computing instructions) that are utilized by one or more components of the processing element, such as the cores 874a, 874b and 884a, 884b, respectively. For example, the shared cache may locally cache data stored in a memory 832, 834 for faster access by components of the processing elements 870, 880. In one or more embodiments, the shared cache 846a, 846b may include one or more mid-level caches, such as level 2 (L2), level 3 (L3), level 4 (L4), or other levels of cache, a last level cache (LLC), or combinations thereof.

While FIG. 8 illustrates a programmable device with two processing elements 870, 880 for clarity of the drawing, the scope of the present invention is not so limited and any number of processing elements may be present. Alternatively, one or more of processing elements 870, 880 may be an element other than a processor, such as an graphics processing unit (GPU), a digital signal processing (DSP) unit, a field programmable gate array, or any other programmable processing element. Processing element 880 may be heterogeneous or asymmetric to processing element 870. There may be a variety of differences between processing elements 870, 880 in terms of a spectrum of metrics of merit including architectural, microarchitectural, thermal, power consumption characteristics, and the like. These differences may effectively manifest themselves as asymmetry and heterogeneity amongst processing elements 870, 880. In some embodiments, the various processing elements 870, 880 may reside in the same die package.

First processing element 870 may further include memory controller logic (MC) 872 and point-to-point (P-P) interconnects 876 and 878. Similarly, second processing element 880 may include a MC 882 and P-P interconnects 886 and 888. As illustrated in FIG. 8, MCs 872 and 882 couple processing elements 870, 880 to respective memories, namely a memory 832 and a memory 834, which may be portions of main memory locally attached to the respective processors. While MC logic 872 and 882 is illustrated as integrated into processing elements 870, 880, in some embodiments the memory controller logic may be discrete logic outside processing elements 870, 880 rather than integrated therein.

Processing element 870 and processing element 880 may be coupled to an I/O subsystem 890 via respective P-P interconnects 876 and 886 through links 852 and 854. As illustrated in FIG. 8, I/O subsystem 890 includes P-P interconnects 894 and 898. Furthermore, I/O subsystem 890 includes an interface 892 to couple I/O subsystem 890 with a high performance graphics engine 838. In one embodiment, a bus (not shown) may be used to couple graphics engine 838 to I/O subsystem 890. Alternately, a point-to-point interconnect 839 may couple these components.

In turn, I/O subsystem 890 may be coupled to a first link 816 via an interface 896. In one embodiment, first link 816 may be a Peripheral Component Interconnect (PCI) bus, or a bus such as a PCI Express bus or another I/O interconnect bus, although the scope of the present invention is not so limited.

As illustrated in FIG. 8, various I/O devices 814, 824 may be coupled to first link 816, along with a bridge 818 that may couple first link 816 to a second link 820. In one embodiment, second link 820 may be a low pin count (LPC) bus. Various devices may be coupled to second link 820 including, for example, a keyboard/mouse 812, communication device(s) 826 (which may in turn be in communication with the computer network 803), and a data storage unit 828 such as a disk drive or other mass storage device which may include code 830, in one embodiment. The code 830 may include instructions for performing embodiments of one or more of the techniques described above. Further, an audio I/O 824 may be coupled to second link 820.

Note that other embodiments are contemplated. For example, instead of the point-to-point architecture of FIG. 8, a system may implement a multi-drop bus or another such communication topology. Although links 816 and 820 are illustrated as busses in FIG. 8, any desired type of link may be used. In addition, the elements of FIG. 8 may alternatively be partitioned using more or fewer integrated chips than illustrated in FIG. 8.

Figure 9:
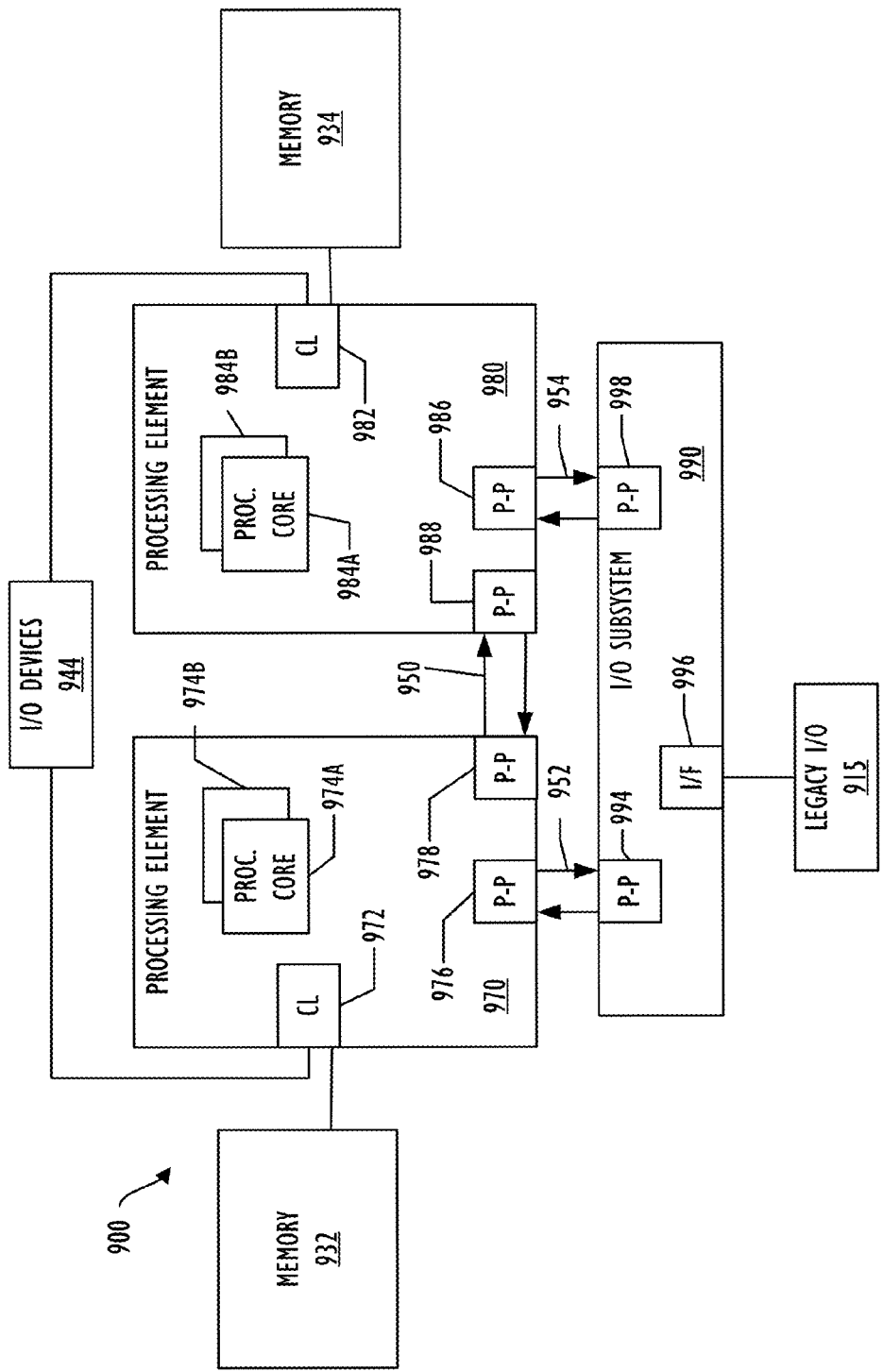
FIG. 9 is a block diagram illustrating another embodiment of computing device for use with techniques described herein.

Referring now to FIG. 9, a block diagram illustrates a programmable device 900 according to another embodiment. Certain aspects of FIG. 9 have been omitted from FIG. 9 in order to avoid obscuring other aspects of FIG. 9.

FIG. 9 illustrates that processing elements 970, 980 may include integrated memory and I/O control logic ("CL") 972 and 982, respectively. In some embodiments, the 972, 982 may include memory control logic (MC) such as that described above in connection with FIG. 8. In addition, CL 972, 982 may also include I/O control logic. FIG. 9 illustrates that not only may the memories 932, 934 be coupled to the CL 972, 982, but also that I/O devices 944 may also be coupled to the control logic 972, 982. Legacy I/O devices 915 may be coupled to the I/O subsystem 990 by interface 996. Each processing element 970, 980 may include multiple processor cores, illustrated in FIG. 9 as processor cores 974A, 974B, 984A and 984B. As illustrated in FIG. 9, I/O subsystem 990 includes point-to-point (P-P) interconnects 994 and 998 that connect to P-P interconnects 976 and 986 of the processing elements 970 and 980 with links 952 and 954. Processing elements 970 and 980 may also be interconnected by link 950 and interconnects 978 and 988, respectively.

The programmable devices depicted in FIGS. 8 and 9 are schematic illustrations of embodiments of programmable devices that may be utilized to implement various embodiments discussed herein. Various components of the programmable devices depicted in FIGS. 8 and 9 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium on which instructions are stored, comprising instructions that when executed cause a machine for detecting computing application malfunctions to: receive an event trace that comprises a plurality of computing events and a plurality of addresses associated with the computing events, construct at least one sample fingerprint associated with a computing application based on the plurality of computing events and the plurality of addresses, compare the at least one sample fingerprint with at least one fingerprint reference, wherein the at least one fingerprint reference represents an expected execution behavior of the computing application, and determine whether the computing application is malfunctioning based upon the comparison of the at least one sample fingerprint and the at least one fingerprint reference.

In Example 2, the subject matter of Example 1 can optionally include instructions, when executed, causes the machine to detect whether the computing application is malfunctioning by performing at least the following: determine a deviation score between the at least one sample fingerprint and the at least one fingerprint reference, compare the deviation score with a deviation criteria, and trigger an in-depth application analysis based upon the comparison of the deviation score and the deviation criteria.

In Example 3, the subject matter of Example 2 can optionally include that the deviation criteria is a deviation threshold, and wherein the in-depth application analysis is triggered when the deviation score is equal to or exceeds the deviation threshold.

In Example 4, the subject matter of Example 3 can optionally include that the deviation threshold is determined from a behavior model associated with the at least one fingerprint reference.

In Example 5, the subject matter of Example 1 can optionally include instructions, when executed, causes the machine to maintain context information regarding a computing system executing the computing application.

In Example 6, the subject matter of Example 5 can optionally include that the context information is used to construct the sample fingerprints.

In Example 7, the subject matter of Example 1 or Example 5 can optionally include instructions, when executed, causes the machine to update the at least one fingerprint reference when a determination is made that the computing application is not malfunctioning.

In Example 8, the subject matter of Example 7 can optionally include that the update of the at least one fingerprint reference is implemented using a backend operation.

In Example 9, the subject matter of Example 1, Example 5, or Example 7 can optionally include that comparing the at least one sample fingerprint with the at least one fingerprint reference is implemented within a hardware management engine.

In Example 10, the subject matter of Example 1, Example 5, or Example 7 can optionally include that comparing the at least one sample fingerprint with the at least one fingerprint reference is implemented within a virtual machine manager.

In Example 11, the subject matter of Example 1, Example 5, or Example 7 can optionally include instructions, when executed, causes the machine to receive memory map information that maps the addresses to logical application level objects.

Example 12 includes a system for detecting computing application malfunctions, comprising at least one processor and a memory, coupled to the processor, and comprises instructions, when executed by the processor causes the system to: generate a plurality of event traces, where each event trace comprises a plurality of computing events and a plurality of addresses associated with the computing events, generate a plurality of sample fingerprints associated with a computing application using the plurality of event traces, compare the plurality of sample fingerprints with at least one fingerprint reference wherein the at least one fingerprint reference is associated with a behavior model that predicts normal operation of the computing application, and determine whether the computing application is malfunctioning based upon the comparison of the plurality of sample fingerprints and the at least one fingerprint reference.

In Example 13, the subject matter of Example 12 can optionally include instructions that cause the system to detect whether the at least one computing application is malfunctioning by performing at least the following: determine a deviation score between the plurality of sample fingerprints and the at least one fingerprint reference, compare the deviation score with a deviation criteria, and trigger an in-depth application analysis based upon the comparison for the deviation score and the deviation criteria.

In Example 14, the subject matter of Example 13 can optionally include that the deviation criteria is a deviation threshold, and wherein the in-depth application analysis is triggered when the deviation score is equal to or exceeds the deviation threshold.

In Example 15, the subject matter of Example 14 can optionally include that the deviation threshold is determined from the behavior model associated with the at least one fingerprint reference.

In Example 16, the subject matter of Example 12 can optionally include instructions that cause the system to maintain context information regarding a computing system executing the at least one computing application.

In Example 17, the subject matter of Example 16 can optionally include instructions that cause the system to construct the at least one sample fingerprint associated with the at least one computing application based on the plurality of computing events, the plurality of addresses, and the context information.

Example 18 includes a method for detecting computing application malfunctions, comprising: collecting, using a programmable device, a plurality of computing events that correspond to a computing application and a plurality of addresses associated with the plurality of computing events, generating, using the programmable device, an event trace that comprises the plurality of computing events and the plurality of addresses, constructing, using the programmable device, at least one sample fingerprint that represents a current behavior of the computing application using at least the event trace, comparing, using the programmable device, the at least one sample fingerprint with a behavior model that represents an expected operation of the computing application, and determining, using the programmable device, whether the computing application is malfunctioning based upon the comparison of the at least one sample fingerprint and the behavioral model.

In Example 19, the subject matter of Example 18 can optionally include that determining, using the programmable device, whether the computing application is malfunctioning further comprises: determining, using the programmable device, a deviation score between the at least one sample fingerprint and the at least one fingerprint reference, comparing, using the programmable device, the deviation score with a deviation criteria, and triggering, using the programmable device, a code analytics engine based upon the comparison for the deviation score and the deviation criteria.

In Example 20, the subject matter of Example 19 can optionally include that the deviation criteria is a deviation threshold, wherein the code analytics engine is triggered when the deviation score is equal to or exceeds the deviation threshold.

In Example 21, the subject matter of Example 18 can optionally include maintaining, using the programmable device, context information regarding a virtualized computing system executing the computing application.

In Example 22, the subject matter of Example 18, Example 20, or Example 21 can optionally include updating, using the programmable device, the at least one fingerprint reference when a determination is made that the computing application is not malfunctioning.

Example 23 includes a system for detecting computing application malfunctions, comprising an event collector and event trace component configured to: receive a plurality of computing events and a plurality of addresses associated with the computing events, generate an event trace for the plurality of computing events, and a fingerprinting engine coupled to the event collector and event trace component and configured to: receive the event trace, construct at least one sample fingerprint associated with a computing application based on the plurality of computing events and the plurality of addresses, compare the at least one sample fingerprint with at least one fingerprint reference, wherein the at least one fingerprint reference represents an expected execution behavior of the computer application, and trigger a code analytics engine based upon the comparison of the at least one sample fingerprint and the at least one fingerprint reference.

In Example 24, the subject matter of Example 23 can optionally include that the fingerprinting engine is further configured to compare the at least one sample fingerprint with the at least one fingerprint reference by: determining a deviation score between the at least one sample fingerprint and the at least one fingerprint reference, comparing the deviation score with a deviation threshold, and wherein the code analytics engine is triggered when the deviation score is equal to or exceeds the deviation threshold.

In Example 25, the subject matter of Example 23 or Example 24 can optionally include that the fingerprinting engine is further configured to maintain context information regarding a computing system executing the computing application.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory machine readable medium on which instructions for detecting computing application malfunctions are stored, comprising instructions that when executed by a machine, cause the machine to:
    receive an event trace of a computing application, the event trace comprising a plurality of computing events and a plurality of memory addresses respectively associated with the plurality of computing events;
    construct at least one sample fingerprint associated with the computing application by grouping the plurality of computing events and the respective plurality of memory addresses according to different memory address ranges and tracking locality of code execution over time, the tracking based on the grouping;
    generate a deviation score by comparing the at least one sample fingerprint with at least one fingerprint reference stored in a storage device, wherein the at least one fingerprint reference represents an expected execution behavior of the computing application;
    determine whether the deviation score satisfies a deviation criteria; and
    trigger an in-depth application analysis of the computing application to determine whether the plurality of computing events indicate a computing application malfunction, responsive to a determination that the deviation score satisfies the deviation criteria.

2. The non-transitory machine readable medium of claim 1, wherein the deviation criteria is a deviation threshold, and wherein the in-depth application analysis is triggered responsive to a determination that the deviation score is equal to or exceeds the deviation threshold.

3. The non-transitory machine readable medium of claim 2, wherein the deviation threshold is determined from a behavior model associated with the at least one fingerprint reference.

4. The non-transitory machine readable medium of claim 1, wherein the instructions, when executed by the machine, cause the machine to maintain context information regarding a computing system executing the computing application.

5. The non-transitory machine readable medium of claim 4, wherein the context information is used to construct the at least one sample fingerprint.

6. The non-transitory machine readable medium of claim 1, wherein the instructions, when executed by the machine, cause the machine to update the at least one fingerprint reference stored in the storage device responsive to the triggered in-depth application analysis determining that the plurality of computing events of the computing application do not indicate the computing application malfunction.

7. The non-transitory machine readable medium of claim 1, wherein comparing the at least one sample fingerprint with the at least one fingerprint reference is implemented within a hardware management engine.

8. The non-transitory machine readable medium of claim 1, wherein comparing the at least one sample fingerprint with the at least one fingerprint reference is implemented within a virtual machine manager.

9. The non-transitory machine readable medium of claim 1, wherein the instructions, when executed by the machine, cause the machine to receive memory map information that maps the plurality of memory addresses to logical application level objects.

10. A system for detecting computing application malfunctions, comprising:
    at least one processor; and
    a memory, coupled to the at least one processor, and comprising instructions that, when executed by the at least one processor, cause the system to:
    generate a plurality of event traces of a computing application, wherein each event trace comprises a plurality of computing events and a plurality of memory addresses respectively associated with the plurality of computing events;
    generate at least one sample fingerprint associated with the computing application by grouping, for each event trace, the plurality of computing events and the respective plurality of memory addresses according to different memory address ranges and tracking locality of code execution over time, the tracking based on the grouping;
    determine a deviation score by comparing the at least one sample fingerprint with at least one fingerprint reference stored in a storage device, wherein the at least one fingerprint reference is associated with a behavior model that predicts normal operation of the computing application;
    determine whether the deviation score satisfies a deviation criteria; and
    trigger an in-depth application analysis of the computing application to determine whether the plurality of computing events indicate a computing application malfunction, responsive to a determination that the deviation score satisfies the deviation criteria.

11. The system of claim 10, wherein the deviation criteria is a deviation threshold, and wherein the in-depth application analysis is triggered responsive to a determination that the deviation score is equal to or exceeds the deviation threshold.

12. The system of claim 11, wherein the deviation threshold is determined from the behavior model associated with the at least one fingerprint reference.

13. The system of claim 10, wherein the instructions, when executed by the at least one processor, cause the system to maintain context information regarding a computing system executing the computing application.

14. The system of claim 13, wherein the instructions, when executed by the at least one processor, cause the system to generate the at least one sample fingerprint based on the plurality of computing events, the respective plurality of memory addresses, and the context information.

15. A method for detecting computing application malfunctions, comprising:
    collecting, using a programmable device, a plurality of computing events that correspond to a computing application and a plurality of memory addresses respectively associated with the plurality of computing events;
    generating, using the programmable device, an event trace of the computing application, the event trace comprising the plurality of computing events and the respective plurality of memory addresses;
    constructing, using the programmable device, at least one sample fingerprint that represents a current behavior of the computing application by grouping the plurality of computing events and the respective plurality of memory addresses according to different memory address ranges and tracking locality of code execution over time, the triggering based on the grouping;

generating a deviation score by comparing, using the programmable device, the at least one sample fingerprint with a behavior model that is stored in a storage device and that represents an expected operation of the computing application;

determining, using the programmable device, whether the deviation score satisfies a deviation criteria; and triggering, using the programmable device, an in-depth application analysis of the computing application to determine whether the plurality of computing events indicate a computing application malfunction, responsive to a determination that the deviation score satisfies the deviation criteria.

16. The method of claim 15, wherein the deviation criteria is a deviation threshold, and wherein the in-depth application analysis is triggered responsive to a determination that the deviation score is equal to or exceeds the deviation threshold.

17. The method of claim 15, further comprising maintaining, using the programmable device, context information regarding a virtualized computing system executing the computing application.

18. The method of claim 15, further comprising updating, using the programmable device, the behavior model stored in the storage device responsive to the triggered in-depth application analysis determining that the plurality of computing events of the computing application do not indicate the computing application malfunction.

19. A system for detecting computing application malfunctions, comprising:

an event collector and event trace component configured to:

receive a plurality of computing events and a plurality of memory addresses respectively associated with the plurality of computing events;

generate an event trace of a computing application based on the received plurality of computing events and respective plurality of memory addresses; and a fingerprinting engine coupled to the event collector and event trace component and configured to:

receive the event trace;

construct at least one sample fingerprint associated with the computing application by grouping the plurality of computing events and the respective plurality of memory addresses according to different memory address ranges and tracking locality of code execution over time, the tracking based on the grouping;

generate a deviation score by comparing the at least one sample fingerprint with at least one fingerprint reference, stored in a storage device, wherein the at least one fingerprint reference represents an expected execution behavior of the computing application;

determine whether the deviation score satisfies a deviation criteria; and trigger an in-depth application analysis of the computing application to determine whether the plurality of computing events of the computing application indicate a computing application malfunction, responsive to a determination that the deviation score satisfies the deviation criteria.

20. The system of claim 19, wherein the fingerprinting engine is further configured to maintain context information regarding a computing system executing the computing application.

* * * * *